May 3, 1960 R. RICHTER 2,935,731
SELECTIVE SIGNALLING SYSTEM
Filed Feb. 26, 1957
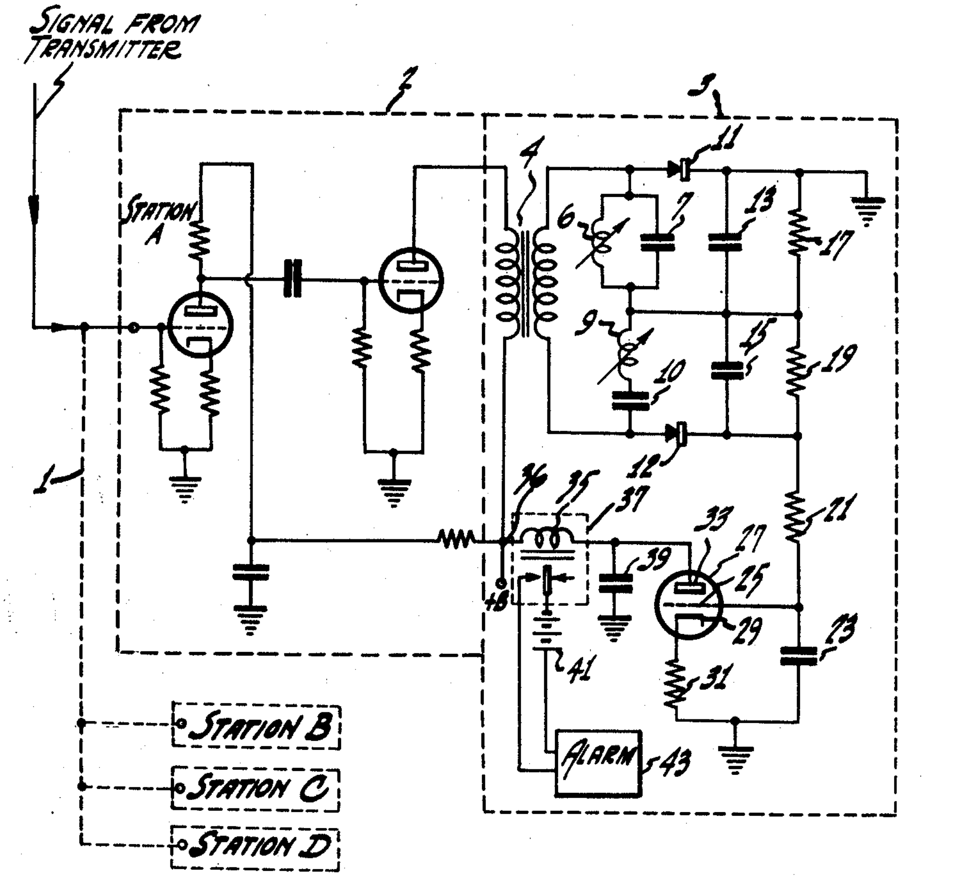
INVENTOR.
ROBERT RICHTER
BY
Charles H. Brown
ATTORNEY

United States Patent Office 2,935,731

Patented May 3, 1960

2,935,731

SELECTIVE SIGNALLING SYSTEM

Robert Richter, Merchantville, N.J., assignor, by mesne assignments, to the United States of America as represented by the Secretary of the Army Application February 26, 1957, Serial No. 642,598

1 Claim. (Cl. 340—156)

This invention relates to a selective signalling system, and particularly to a novel method of and means for calling a selected station or stations on a common transmission line, or in a wireless communications network, without disturbing the other stations in the network.

Existing selective signaling systems for common transmission line and wireless communication networks utilizing a plurality of stations are subject to false alarms. This occurs when the alarm circuit located at each station is triggered off by speech or other complex waveforms, the frequency spectrum of which is rich in the fundamental frequency of the alarm signal.

An object of the invention is to alert a selected station or stations in a selective signaling system by a tone or alarm signal without disturbing other stations in the network.

Another object of the invention is to provide an alert circuit for use in conjunction with a radio receiver which will not be triggered off by speech or other complex waveforms the frequency spectrum of which may be rich in the fundamental frequency of an alarm signal.

Briefly stated, the invention comprises a selective calling system which provides protection against false operation and wherein the control voltage developed for alerting a station is the difference between the voltages developed by the frequency of the alarm signal and all the frequencies of the intelligence signals except the alarm signal frequency.

A more detailed description of the invention follows in conjunction with a drawing, the sole figure of which is a schematic diagram of the selective signaling circuit provided at each station of the selective signaling system.

Referring to the drawing in detail, there is shown a selective signaling system in a communication network comprising stations A, B, C, and D. The communication network may be of the wireless type or it may be connected by a transmission line shown as the dotted line 1. Each station has an audio amplifier 2 coupled to a differential alarm circuit 3. In the wireless communication network the amplifier 2 is the audio amplifier stage of a radio receiver. The audio amplifier is coupled to the differential alarm circuit 3 through an audio interstage transformer 4. The secondary winding of transformer 4 is connected across a parallel resonant circuit 6, 7 serially connected with a series resonant circuit 9, 10. The parallel resonant circuit contains a variable inductance coil 6 connected in parallel with a condenser 7. The series resonant circuit contains a variable inductance coil 9 serially connected with a condenser 10. A first diode detector 11 is serially connected with a storage condenser 13 across the parallel resonant circuit 6, 7.

A second diode detector 12 is serially connected with a storage condenser 15 across the series resonant circuit 9, 10. The junction of diode detector 11 and storage condenser 13 is connected to ground. A bleeder resistance 17 is connected across storage condenser 13 and a bleeder resistance 19 is connected across storage condenser 15. A grid bias resistor 21 is connected from the junction of diode detector 12 and storage condenser 15 to the control grid 25 of a vacuum tube 27. A bypass condenser 23 is connected from the junction of resistor 21 and the control grid 25 of vacuum tube 27 to ground. The cathode 29 of vacuum tube 27 is connected to ground through a current limiting resistor 31. The plate 33 of tube 27 is connected to one end of the solenoid 35 of relay 37. The other end of solenoid 35 is connected to the positive terminal B+ of a source of unidirectional current and one end of the primary winding of audio interstage transformer 4 at point 36. A time delay condenser 39 is connected from the plate 33 of tube 27 to ground. The purpose of condenser 39 is to provide a delay in relay switching by keeping current sensitive relay 37 on for the time delay desired.

Tube 27 is normally conducting as a result of which relay 37 is energized. When an alarm signal of the correct frequency is applied to the differential alarm circuit, tube 27 is biased to cut-off and relay 37 is de-energized. If desired, the operation of the relay can be reversed to provide activation only when the correct alarm signal is applied to the differential signaling circuit. The contacts of relay 37 are shown connected to a battery 41 and an alarm device 43.

It is only necessary to tune the parallel resonant circuits 6, 7 of the different stations to respectively different frequencies to make the alarm circuit selective. Thus, when a specific alarm signal composed of a specific frequency is transmitted over the transmission line 1 connecting stations A, B, C and D only the station or stations tuned to the specific frequency of the alarm signal will be activated. The level of the alarm signal can be as much as 13 decibels below the normal audio level and still deactivate relay 37.

The parallel resonant circuit 6, 7 is tuned to the alarm signal frequency by adjusting the variable inductance coil 6, and the series resonant circuit is tuned to the alarm signal frequency by adjusting the variable inductance coil 9. By way of example, an alarm signal having a frequency of 1600 cycles may be used in which case both the parallel resonant circuit and the series resonant circuit would be tuned to the 1600 cycle frequency. Assuming that a particular station to be selected is tuned to be alerted at the 1600 cycle frequency, the parallel resonant circuit 6, 7 presents a high impedance to the 1600 cycle alarm signal causing all of the alternating current (A.C.) voltage of the alarm signal to appear across the circuit. The A.C. voltage of the alarm signal is detected by the first diode detector 11 and the storage condenser 13 is negatively charged with respect to ground to the level of the detected voltage. The series resonant circuit 9, 10 presents a relatively high impedance to all frequencies except the 1600 cycle frequency of the alarm signal to which it is tuned. The A.C. voltage of all signals received by the radio receiver in the wireless communications network, or received over the transmission line in the wired communication network, except the A.C. voltage of the alarm signal frequency appears across the series resonant circuit 9, 10 and is detected by the second detector 12. The storage condenser 15 is positively charged with respect to ground to the level of the detected voltage.

The Q of the parallel resonant circuit 6, 7 is made higher than the Q of the series resonant circuit 9, 10 for two reasons. First speech or other tones should not prevent operation of the relay at the selected station when the 1600 cycle alarm signal is received. The negative voltage developed by the parallel resonant circuit (due to the fixed level input of the 1600 cycle alarm signal) should be greater than the positive voltage developed across the series resonant circuit due to other frequencies or tones of the same input level as the alarm signal. The negative voltage developed across resistor 17 by the 1600 cycle alarm signal will always override any positive voltage developed across resistor 19 by other frequencies of the same input level. The positive voltage of resistor 19 subtracts from the larger negative voltage on resistor 17 leaving a negative bias on control grid 25 of tube 27 and this negative bias is of such value as to cut the tube off and de-energize relay 37.

The amount that the negative voltage on resistor 17 can be made greater than the positive voltage on resistor 19 is determined by the consideration that it is not desired to have speech give false relay operation. For speech, the integration of the positive voltage (developed by the voice spectrum frequency components different from 1600 cycles) over the entire voice bandwidth gives an overall positive voltage level higher than the negative voltage level developed by the 1600 cycle speech component. If the negative voltage developed across resistor 17 is designed to be of too high a value with respect to the positive voltage developed across resistor 19, it will be possible to get false relay operation from speech with strong 1600 cycle spectrum components even when there is no alarm signal of 1600 cycles on the line. To prevent false operation of the relay in this case the Q of the parallel tuned circuit is decreased by decreasing the value of bleeder resistor 17. The ratio of the negative voltage to the positive voltage is thus bracketed by the above two conditions. The second reason for having a higher Q in the parallel resonant circuit is to insure that the negative voltage developed by the 1600 cycle components of the speech spectrum will be decreased due to narrowing of the pass band of the tuned stage. This provision further helps to prevent false operation of the alarm relay. In actual practice, the Q of the parallel tuned circuit is made twelve to fourteen decibels higher than the Q of the series tuned circuit. The Q of the parallel tuned circuit is increased by increasing the value of the bleeder resistance 17 and conversely decreased by decreasing the value of bleeder resistance 17. The Q of the parallel resonant circuit is adjusted to fit the band width of the communication signals.

The invention may be used in a communication network employing a multiplicity of receivers connected to a common transmission line. In such case, each receiver in the network may be provided with the differential signaling circuit of the invention, and each differential signaling circuit may be tuned to a different alarm signal frequency to be sent over the common line. The arrangement allows individual stations to be alerted or called selectively, or activated, without disturbing other stations in the network.

This method of signaling allows use of existing audio facilities, such as the audio stage of communication receivers in a network, for remote alerting or on-off operation of equipment by transmitting microwatts of power over existing audio paths. Normal audio or speech signals will not trigger the selective signaling circuit.

Having described the invention, what is claimed is:

A system for selectively alerting a plurality of stations by different alarm signal frequencies, each of said stations including an alarm circuit comprising, in combination, an audio transformer having a primary winding to which signalling frequencies including the alarm signal frequencies fed over said system are applied and a secondary winding, a parallel tuned resonant circuit and a series tuned resonant circuit connected in series across said secondary winding, said parallel tuned resonant circuit including a first variable inductor and a first condenser and said series tuned resonant circuit including a second variable inductor and a second condenser, the values of said inductors and condensers being determined to cause said parallel and series tuned resonant circuits to both be tuned to a particular one of said alarm signal frequencies, the Q of said parallel tuned resonant circuit being twelve to fourteen decibels higher than the Q of said series tuned resonant circuit, a first diode and a third condenser series-connected across said parallel tuned resonant circuit, a second diode and a fourth condenser series-connected across said series tuned resonant circuit, a first resistor connected across said third condenser, a second resistor connected across said fourth condenser and in series with said first resistor to form a resistive network, means to connect the junction of said first diode and said first resistor to a point of reference potential, a triode vacuum tube having a plate, grid and cathode, a third resistor, means to connect said grid to the junction of said second diode and said second resistor through said third resistor, a fifth condenser connected between said grid and said point of reference potential, a fourth resistor connected between said cathode and said point of reference potential, a relay device having a winding and a pair of contacts arranged to be open upon said winding being energized, means to connect one end of said winding to said plate and the other end of said winding to the positive terminal of a source of unidirectional potential, a time delay condenser connected between said plate and said point of reference potential, an alarm device and a source of unidirectional potential connected in series across said contacts, said series tuned resonant circuit presenting a relatively high impedance to said signalling frequencies other than said particular alarm signal frequency to cause by the action of said second diode device and said fourth condenser a positive voltage to appear across said second resistor, said parallel tuned resonant circuit presenting a relatively high impedance to said particular alarm signal frequency to cause by the action of said first device and said third condenser a negative voltage greater than said positive voltage to appear across said first resistor, whereby said tube is normally conducting to cause said alarm device to remain inoperative by the open condition of said contacts and becomes non-conducting in response to said negative voltage to de-energize said winding and operate said alarm device through the resulting closed condition of said contacts.

References Cited in the file of this patent

UNITED STATES PATENTS

| | | |
|---|---|---|
| 1,958,166 | Laurent | May 8, 1934 |
| 2,117,721 | Hornickle | May 17, 1938 |
| 2,162,268 | Meszar | June 13, 1939 |
| 2,307,834 | Gannett | Jan. 12, 1943 |
| 2,319,306 | Dickieson | May 18, 1943 |
| 2,496,730 | Lindbeck | Feb. 7, 1950 |
| 2,569,000 | Hadfield | Sept. 25, 1951 |

FOREIGN PATENTS

| | | |
|---|---|---|
| 84,469 | Switzerland | Oct. 1, 1935 |